United States Patent
Borrill (10) Patent No.: US 12,451,974 B2
(45) Date of Patent: *Oct. 21, 2025

(54) CLASSICAL IMPLEMENTATION OF ENTANGLEMENT

(71) Applicant: Paul L. Borrill, Palo Alto, CA (US)

(72) Inventor: Paul L. Borrill, Palo Alto, CA (US)

(73) Assignee: Eric Litak, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/528,706

(22) Filed: Dec. 4, 2023

(65) Prior Publication Data
US 2025/0112707 A1    Apr. 3, 2025

Related U.S. Application Data (63) Continuation of application No. 17/681,834, filed on Feb. 27, 2022, now Pat. No. 11,876,566, which is a continuation of application No. 15/959,161, filed on Apr. 20, 2018, now Pat. No. 11,296,800, which is a continuation-in-part of application No. 15/687,529, filed on Aug. 27, 2017, now Pat. No. 11,516,007, which is a continuation of application No. 14/331,225, filed on Jul. 14, 2014, now Pat. No. 9,774,401.

(Continued)

(51) Int. Cl.
*H04L 45/74* (2022.01)
*H04B 10/70* (2013.01)

(52) U.S. Cl.
CPC .................... *H04B 10/70* (2013.01)

(58) Field of Classification Search
CPC ....... H04B 10/70; H04L 9/0852; H04L 12/24; H04L 12/707; H04L 41/12; H04L 45/72; H04L 45/74; H04L 45/745; H04Q 2011/0073; H04Q 2213/13352; H04Q 2213/13353; H04Q 2213/13541; H04Q 2213/352; H04W 84/18; H04W 88/06; H04W 92/02; H04W 92/04
See application file for complete search history.

(56) References Cited

U.S. PATENT DOCUMENTS 6,993,022 B1    1/2006  James et al.
7,440,436 B2   10/2008  Cheng et al.
(Continued)

OTHER PUBLICATIONS

Borrill, Insights into the Nature of Time in Physics, and implications for Computer Science, Earth Computing, Inc., 58 pages, Apr. 16, 2014.*

(Continued)

*Primary Examiner* — Frank Duong
(74) *Attorney, Agent, or Firm* — Bhasin Law, a Professional Corporation (57) ABSTRACT

Computational nodes are connected to each other via multiple point to point communication ports to form a mesh network. When a node receives such a routing information, it will be a set of {Route ID, Forwarding Ports} pair, where the ports can be multiple targets including the node itself. When all the nodes within the routing path receive such information, the mesh system can handle the packet transfer for the given Route ID. Each node looks up the table with Route ID and determines where to forward the packet.

13 Claims, 9 Drawing Sheets

Related U.S. Application Data (60) Provisional application No. 61/846,602, filed on Jul. 15, 2013, provisional application No. 61/893,285, filed on Oct. 21, 2013, provisional application No. 61/913,302, filed on Dec. 8, 2013, provisional application No. 62/488,025, filed on Apr. 20, 2017.

(56) References Cited

U.S. PATENT DOCUMENTS

| | | |
|---|---|---|
| 7,623,459 B2 | 11/2009 | Yang et al. |
| 7,626,967 B2 | 12/2009 | Yarvis et al. |
| 7,836,007 B2 | 11/2010 | Beausoleil |
| 9,173,111 B2 | 10/2015 | Pace et al. |
| 2004/0208638 A1* | 10/2004 | Jansen ............... H04B 10/2513 398/183 |
| 2009/0037451 A1 | 2/2009 | Borrill |
| 2009/0046732 A1 | 2/2009 | Pratt et al. |
| 2009/0254572 A1 | 10/2009 | Redlich et al. |
| 2010/0085916 A1 | 4/2010 | Yu et al. |
| 2010/0165886 A1 | 7/2010 | Borrill |
| 2011/0113099 A1 | 5/2011 | Teng et al. |
| 2014/0347975 A1 | 11/2014 | Yoshimoto |
| 2016/0105439 A1 | 4/2016 | Hunt et al. |
| 2019/0141016 A1 | 5/2019 | Borrill |

OTHER PUBLICATIONS

Chen, Breaking Quantum Limits with Collective Cavity-QED: Generation of Spin Squeezed States via Quantum Non-Demolition Measurements, Thesis, University of Colorado, 214 pages, 2013.*
Schleier-Smith, Cavity-Enabled Spin Squeezing for a Quantum-Enhanced Atomic Clock, Thesis, Massachusetts Institute of Technology, 135 pages, Jun. 2011.*
Marcello Caleffi, "Optimal routing for quantum networks", IEEE Access, Oct. 16, 2017, vol. 5, pp. 22299-22312.
Borrill and Karp, "The time-less datacenter", Stanford EE Computer System Colloquium, Nov. 16, 2016.
Reutter and Vicary, "A classical groupoid model for quantum networks", Department of Computer Science, University of Oxford, Oct. 4, 2018.
Ian F. Akyildiz, "A survey on wireless mesh networks", IEEE Radio Communications, Sep. 2005.
Bruno et al,, "Mesh networks: Commodity multihop ad hoc networks", IEEE Communications Magazine, Mar. 2005.
DARPA Quantum Network Testbed, Final Technical Report, Jul. 2007.
Xiu et al., Quantum Teleportation Schemes of an N-Particle State via Three-Particle General W States, Commun. Theor. Phys. Beijing China, vol. 49, No. 4, 4 pages, Apr. 15, 2008.
Tsai et al., Teleportation of a Pure EPR State via GHZ-like State, Springer, 7 pages, May 21, 2010.

\* cited by examiner

CLASSICAL IMPLEMENTATION OF ENTANGLEMENT

CROSS-REFERENCE TO RELATED APPLICATIONS

This application is a continuation of U.S. patent application Ser. No. 17/681,834 filed Feb. 27, 2022, which is a continuation of U.S. patent application Ser. No. 15/959,161 filed Apr. 20, 2018, now an issued U.S. Pat. No. 11,296,800, issued on Apr. 5, 2022, which claims the benefit of and priority under 35 U.S.C. § 119 (e) of U.S. Provisional Application No. 62/488,025, filed Apr. 20, 2017, and is continuation-in-part of U.S. patent application Ser. No. 15/687,529, filed Aug. 27, 2017, now an issued U.S. Pat. No. 11,516,007, issued on Nov. 29, 2022, which is a continuation of U.S. patent application Ser. No. 14/331,225, filed Jul. 14, 2014, now issued U.S. Pat. No. 9,774,401, issued on Sep. 26, 2017, which claims the benefit under 35 U.S.C. § 119 (e) of U.S. Provisional Application No. 61/846,602, filed on Jul. 15, 2013; of U.S. Provisional Application No. 61/893,285, filed on Oct. 21, 2013; of U.S. Provisional Application No. 61/913,302, filed on Dec. 8, 2013; is related to U.S. patent application Ser. No. 14/520,331, filed Oct. 21, 2014, which claims the benefit under 35 U.S.C. § 119 (e) of U.S. Provisional Application No. 61/893,285, filed on Oct. 21, 2013; U.S. Provisional Application No. 61/913,302, filed on Dec. 8, 2013; is related to U.S. patent Ser. No. 14/564,015, filed Dec. 8, 2014, now abandoned, which claims the benefit under 35 USC § 119 (e) of U.S. Provisional Application No. 61/913,302, filed on Dec. 8, 2013. Each of the above-referenced U.S. patents, U.S. applications and provisional patent applications are incorporated by reference herein in its entirety.

FIELD OF THE INVENTION

The present invention generally relates to systems and methods for communication between networking systems, and, more particularly, relates to a mesh networked system formed with multiple networking nodes connected to each other via one-to-one connection via multiple ports on each node.

BACKGROUND

A state of temporal intimacy may be constructed on a link by taking the arrival of a packet containing an "Element of Shared Information" (ESI) and sending it back down a link (bipartite communication channel). If the other side does the same, then we have a symmetric "timeless" link: a classical implementation of the correlated states of a bipartite entangled system. From an engineering perspective, we are interested in properties that can be derived from temporal intimacy; such as its potential to replace heartbeats and timeouts in distributed algorithms, enable atomic (all or nothing) transactions, and to establish non-cloneable states which may be used to securely transfer private information (secrets) across classical systems.

We distinguish between a Local Observer View (LOV), where the locus of observation is one side of the link (Alice, or Bob, separately), and a God's-Eye View (GEV) where the entire link represents a single entity to be observed (Alice and Bob together). In the case of the latter, there will be no visible evolution of the link, because the ESI is trapped within the link.

Several implementations are possible. For example, we can use Ethernet interfaces to send packets between two computers connected by a common cable, or back-to-back connected PCIe interfaces. A special ENTL packet is used to signal this timeless state. When one side (say Alice) experiences a local event on receipt of an ENTL packet, she responds by applying a simple transform and sending the modified ENTL packet back down the wire to Bob on the other end of the Ethernet cable. Bob does the same, and we now have a circulating (self-regenerating) ENTL protocol.

This is different to a conventional send/acknowledge protocol, because, once started, it continues in perpetuity (until some external event creates change). It is different also in that causality is now self-regenerating within the link, instead of being initiated by the computer on one side of the link or the other. This description is targeted to an audience of electrical engineers and computer scientists.

Therefore, what is needed is a robust technique for a mesh networked system formed with multiple networking nodes connected to each other via one-to-one connection via multiple ports on each node.

SUMMARY

The present disclosure addresses the above-mentioned shortcomings with systems, methods and non-transitory computer-readable media directed to a mesh networked system formed with multiple networking nodes connected each other via one-to-one connection via multiple ports on each node.

Computational nodes are connected to each other via multiple point to point communication ports to form a mesh network. It provides flexible generic communication path between nodes within the mesh network. A unique routing index (Route ID) is used to represent a communication path between nodes within the mesh network. When a new Route ID is created in the system, a higher-level routing mechanism provides the path for the routing. A simple case is a pair of {source, destination}. This can also be a path for multicast, which gives a set of destinations {destination1, destination2, . . . }. Here, it is assumed that there is a higher communication protocol which transfers this routing information on the network. On such a communication path, the Route ID and necessary forwarding information is passed to the source, destination nodes, as well as the nodes in between. The calculation of such path is assumed to be done in the upper routing protocol/mechanism, and is not a subject of this invention.

When a node receives such a routing information, it will be a set of {Route ID, Forwarding Ports} pair, where the ports can be multiple targets including the node itself. When all the nodes within the routing path received such information, the mesh system can handle the packet transfer for the given Route ID. Each node looks up the table with Route ID, and determines where to forward the packet.

With the present technique, each node uses a linear table to store the routing information entries. The new entry is indexed directly as the memory offset within the table. This index is called the LookUp ID. Within the new entry in the routing table, the Forwarding Port to the destination is recorded. Then, via the upper routing protocol, this LookUp ID is passed to the source side of the next neighbor on this routing path. The neighbor receives the LookUp ID of next forwarding neighbor, and records it into the entry associated to Route ID, as the next Lookup ID of the forwarding port.

So, each node has an entry for the Route ID with {Forwarding Port, Next LookUp ID} pair according to the routing path.

When a packet is sent from the destination, the sender looks up the entry in the lookup table. At the very beginning of the transfer, it uses a mapping mechanism to determine the table entry from the Route ID. Then, it forwards the packet to the port specified in the table entry. At this point, the sender updates a field in the packet header with the Next LookUp ID corresponding to the forwarding port. Thus, the next neighbor node will receive the packet header with the LookUp ID of its own, and it can directly lookup the Forwarding Table with LookUp ID as the direct memory offset. Each node updates the LookUp ID field in the packet header with the value associated with the forwarding port when it forwards the packet to the next node. So, all nodes can use direct table lookup, without the need for a more complex and thus slower mapping mechanism between Routing ID and the table entry.

The forwarding port information can be more than one, to support multi-cast information. The table entry also can hold Child port and Parent port with corresponding LookUp IDs to support bidirectional path with a single entry.

Advantageously, effective data distribution is achieved without special hardware such as CAM.

BRIEF DESCRIPTION OF THE FIGURES

The present disclosure is illustrated by way of example, and not by way of limitation in the figures of the accompanying drawings in which like reference numerals are used to refer to similar elements.

DETAILED DESCRIPTION

This disclosure generally discloses computer-implemented methods, non-transitory computer-readable media, and devices for packet forwarding in a distributed computer system. One of ordinary skill in the art will recognize various alternatives within the spirit of this disclosure, even if not specifically discussed herein.

Basic Link Architecture

Figure 1:
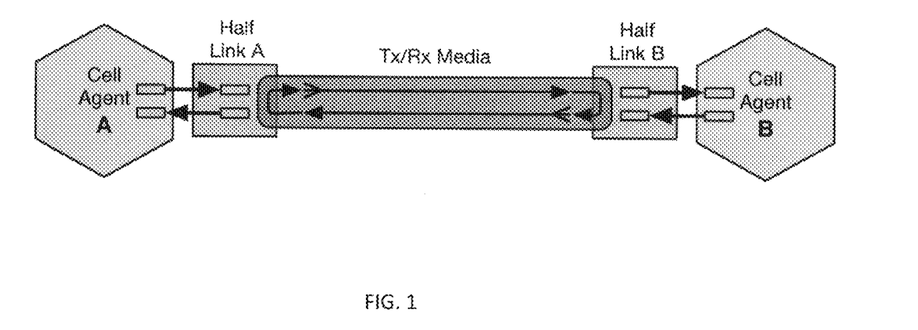
FIG. 1 shows a link, according to an embodiment.

The basic architecture of the link is shown in FIG. 1.1. It comprises the Tx/Rx media (blue bar) in the center, plus the two Half Links on either side. A mechanism exists at either side (just inside the Half Link/grey box) to detect the type of packet, and to automatically resend if the type is ENTL. The recirculating arrows inside the media (blue bar) indicate that these events and shared (recirculating) information is completely hidden.

FIG. 1 shows a link, according to an embodiment.

From each Cell Agent's perspective, its end of the blue bar can be a source of recurring events, a kind of 'clock'. But normally it does its "TICK-TOCK" silently, until the agent on either side of the link does a push to the register in the half link. The counter in this 'clock' is constrained to modulo (e.g. 2) addition. Typically, the receipt of an ENTL packet is treated as a TICK, and the retransmission of the (transformed) packet may be treated as a TOCK. Alice's TICK may therefore be Bob's TOCK. The arrangement is symmetric: each side of the link thinks it is Alice from its LOV, and the other side is Bob. This is one of several possible protocols.

Hidden ENTL Packet Protocol

ENTL is a "timeless" protocol that nonetheless maintains temporal intimacy through the exchange (causal circulation) of packets: a basic resource we can hang higher level operations on in a system of distributed nodes (cells). This "hot-potato" packet is circulated at the lowest possible level in the link between two parties: Alice and Bob. Ideally, on the very edge of the hardware that recognizes the packet types as they arrive. If the type is ENTL, it sends it back down the link to the sender. The sender is now the receiver, and it recognizes ENTL, and does the same. This continues until an agent on either side wishes to send an Atomic Information Transfer (AIT) token.

The hidden (self-circulating) ENTL packet mechanism is shown in FIG. 1.2. ENTL is organized to be as free as possible from any clocks on both sides of the link. In effect the link is a clock1, with its own characteristic period depending on the length of the cable and the amount of "mechanism" needed to receive and recognize the packet, and to send it back out again. This ENTL mechanism is self-generating (once started), and is exquisitely sensitive to packet loss (c.f. the FLP result).

In practice, many implementations, especially those which use standard Ethernet NIC's, will compromise this property in order to be compatible with legacy interfaces. While it may still be possible to extract some of the benefits of quantum protocols under these conditions of compromise, we encourage future interface standards organizations (the IEEE and others) who may wish to support this protocol, to strictly require this "deep asynchronous" property, to enable a more faithful implementation of the physics; which will more reliably, and securely, yield the properties we wish to exploit for general use in distributed systems.

Figure 2:
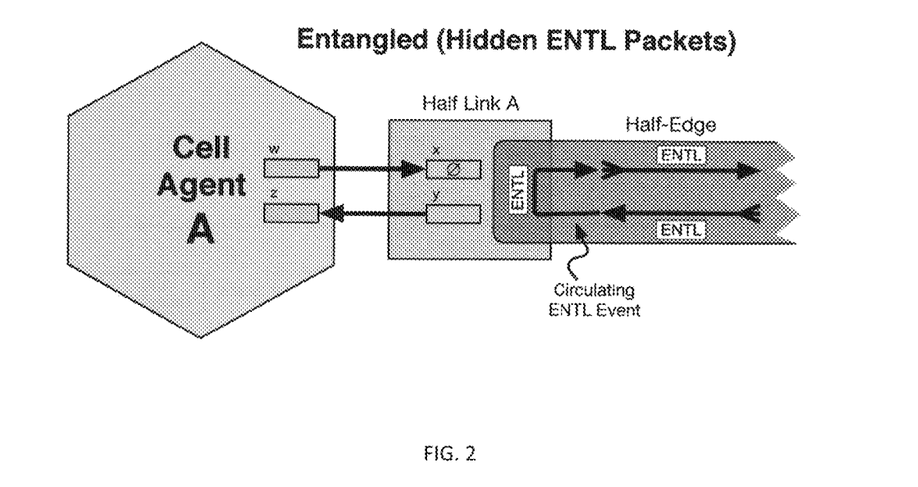
FIG. 2 shows a ENTL hidden events, according to an embodiment.

It is important to notice the various synchronization domains in the implementation. Normally, a Network Interface Controller (NIC) synchronizes its registers and buffer memory with its local CPU (i.e. the Cell Agent), and independently, synchronizes the bits it sends on the wire with a separate clock associated with the Ethernet Standard it wishes to conform to (e.g. 10/25/100 Gbit transfer rate). In the figure(s) above, however, the preferred implementation would have NO synchronization whatsoever (i.e. It would not cross any clock domains). The only synchronization signal would be the leading edge (change) in the signal on the media indicating the arrival of information at Alice's receiver. The same would be true on the opposite end on Bob's receiver. We refer to this complete lack of external sources of synchronization as the deep asynchronous domain.

FIG. 2 shows a ENTL hidden events, according to an embodiment.

A link comprises two Half-Edges, each Half-Edge comprises a Half-Link and connection to media. The link is equipped with basic mechanisms to hide the state of internal packet exchanges on the media (entanglement).

While the mechanism inside the blue curved box is self-contained, on each receipt of the ENTL packet, it checks the input register (x) in the Half Link to see if the local Cell Agent wishes to transfer data. If it is empty, the ENTL packet is transformed, and sent back down the link to maintain the timeless state.

ENTT (Send AIT) Packet Protocol

Figure 3:
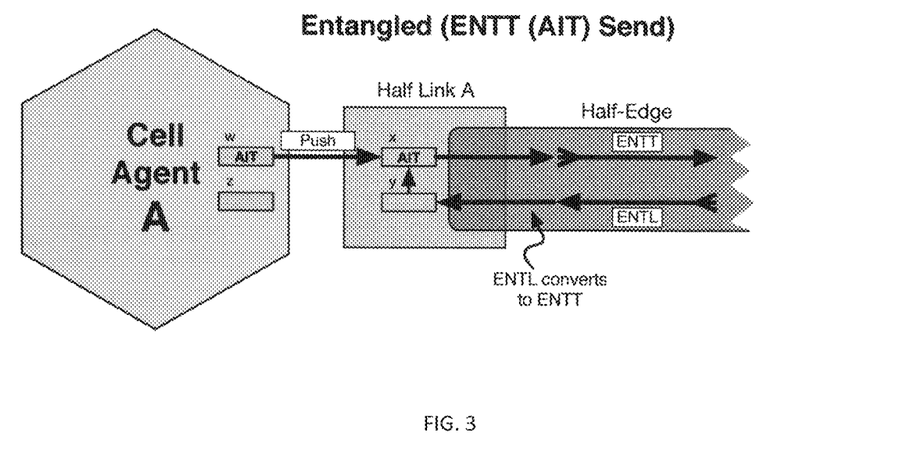
FIG. 3 shows an AIT send, according to an embodiment.

As shown in FIG. 1.3, if the input register (x) from the cell agent register (w) contains an AIT packet, then the ENTL packet is replaced by an ENTT packet, which initiates the 4-phase (locally reversible) protocol to "transfer" the AIT token from this side of the link to the other. Once the 4-phase ENTT protocol is complete, the ENTT packet is replaced by an ENTL packet to terminate the transfer, and return the link to its timeless state.

FIG. 3 shows an AIT send, according to an embodiment.

Figure 4:
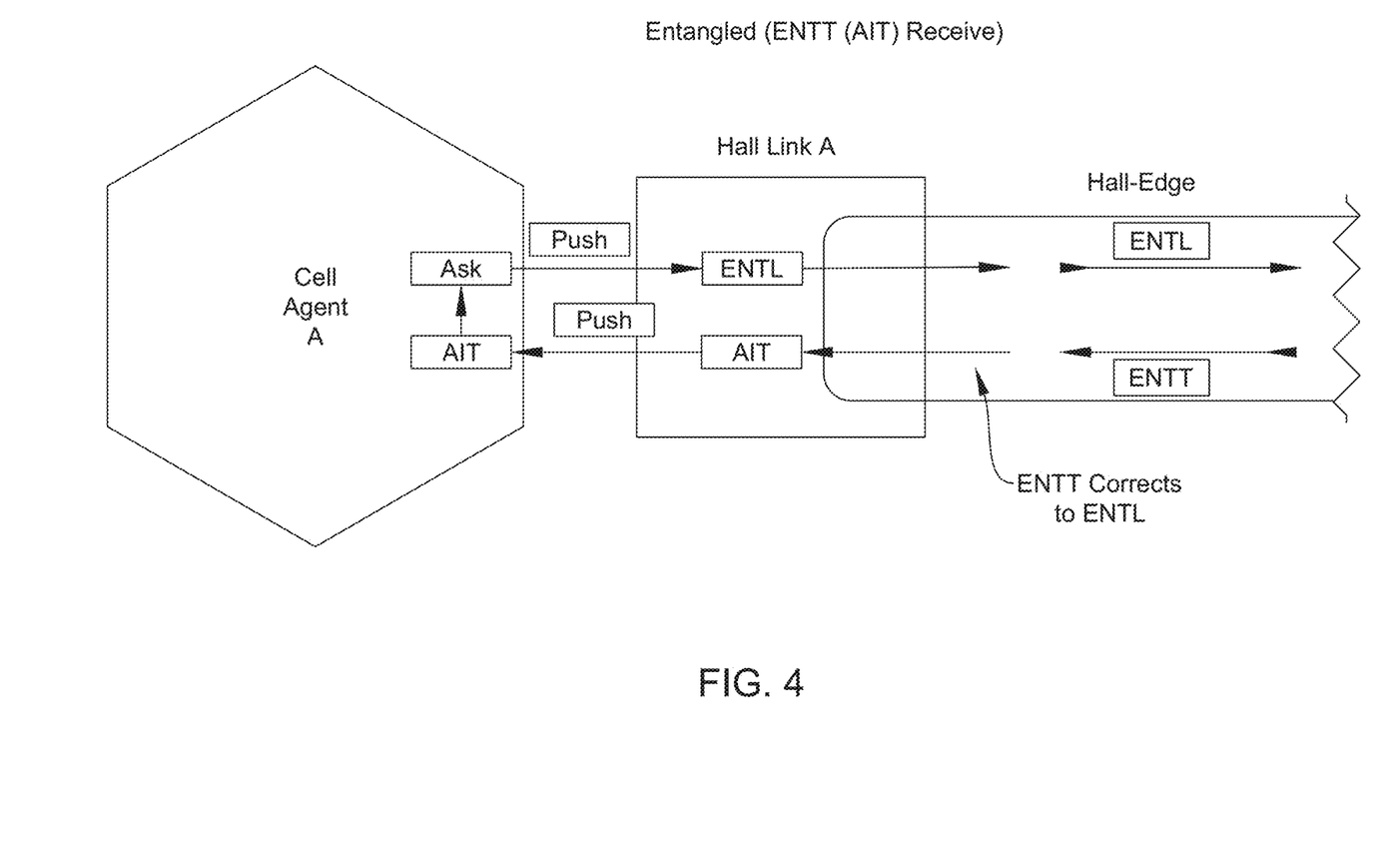
FIG. 4 shows an AIT receive, according to an embodiment.

FIG. 4 shows an AIT receive, according to an embodiment.

An Element of Shared Information (ESI)

The implementation transfers an "Element of Shared Information" (ESI). This requires more than a single bit (which can encode only two states in each local register or memory). When Alice has the ESI (from a LOV perspective), then Bob does not have it, and visa versa. If Alice does not have the ESI, then we must make room to encode a 3rd state: that the ESI not owned on this side and is missing i.e., the register is empty (Ø). If Alice keeps a shadow of the ESI (for example, that it was a binary 1 last time she saw it), then the first bit represents the presence of the ESI, and the 2nd bit represents the value of the ESI.

Time (change that we can count) is represented by a modulo counter. Different moduli will yield different properties in the link which may be exploited at higher levels in the system. Because the modulo counter "rolls over", it will bound the amount of evolution that can occur before the recurrence of the count. A modulo 1 counter is timeless (no perceived change in state on either side of the link). A modulo 2 counter (as used in ENTL) provides only 2 states (TICK, TOCK) in the recurrence from a LOV perspective, but will also be timeless from a GEV (looking at the two-half links and the media as a single entity). A modulo-4 counter, as used in ENTT, allows the expression of 4 states, and is the minimum configuration which enables a distinction in the forward and backward evolution of the protocol, and thus, the minimum mechanism for atomically transferring an AIT token from one side of the link to another. Larger moduli allow greater spans of counts; allowing extension to, for example, chains of cells and links in a datacenter environment.

The basic mechanism in the link, is to exchange the "information" in x and x registers on the near side of the link (e.g., Alice), with the "information'" in the x and y registers on the other side (e.g., Bob) side of the link, atomically, i.e. with a protocol that is so simple, the only states that can exist, is with this information on one side.

There are several ways of doing this. A single logical bit can be swapped, or 2 or more bits can be swapped. One approach is to combine a pair of bits on one side, with a (local) atomic exchange (compare and swap instruction) of a local variable onto the wire, leaving the local state "empty" (plus a shadow of what the bit used to be) in the local persistent register, and full bit(s) "on the wire". The other end receives these bits, and transforms them to go into the local memory—or register—and the cycle continues.

Several encoding methods are possible. By assuming that the state on each side represents, say a 2-bit column vector, we can treat all four bits as a 2×2 matrix, against which the above transform can be applied, as if it were a matrix multiply. In practice, because the state space is potentially small, it is most likely implemented with a lookup table. The algebra of Hadamard matrices, is nominally used to represent the tick tock state, and the algebra of Pauli matrices may be used to represent the atomic transfer of information, complete with the representation of the "state on the wire.

The ESI is designed to represent half of this information, a positive (+1) state on one side, and the other half of the information (−1) on the other side and arrange through the protocol for this to always be complementary. The pair of states, represents a "complete" ESI.

The goal is to take a property of "information surprise" and perpetually reverse it on a single link with the least possible mechanism. The above examples on how to do this is only one of several possible ways to do this.

Liveness (The ENTL protocol) is established by the perpetual exchange of the contents of the registers on each side of the link. By combining the registers, e.g. merging two 32-registers into a single 64-bit register, and atomically swapping two halves of the register using a swap (or compare and swap) instruction in a processor or other (e.g. gate array) logic on each side.

Atomic Information transfer can be achieved by atomically exchanging information from the w register with the contents of the x register (at any time). The next time the ENTL packet arrives, it will then carry this (ENTT) information onto the wire to the other side. When the other side receives it, the "compare" part of the "compare and swap" discovers this is no longer an ENTL state, it can extract the information by doing a swap into the z register on that side, and the transfer is in progress.

Two states are required for "presence management" (temporal intimacy), but four states are required to (reversibly or irreversibly) transfer information from one side to the other. Think of the ESI as a "carrier" which can move a bit or set of bits from one side to the other.

An important use case for this mechanism is to circumvent (to a large extent) the problem of "common knowledge" in distributed systems. Although this is valuable in datacenters, where the link media can be more easily guaranteed to be a single segment (without intermediate elements or repeaters), it can also be used in long-haul links (for example, direct fiber between datacenters owned by the same company).

In many respects, this provides significant advantages in how to deal with latency, which is a major factor in modern data centers, especially in synchronizing redundant replicas in different data centers, to mitigate against various perturbations (failures, disasters, attacks).

The ENTL mechanism provides the fastest physically possible way for two sides of a link to "know" what is going on the other side of the link. In principle, only the speed of light (in whatever medium) is the limiting factor to this "temporal intimacy". The ENTT mechanism provides the simplest, and fastest way to atomically transfer an element of information over a single link, and, by staging the AIT tokens persistently at each cell, we can pre-allocate a near ideal mechanism to recover when something (link or cell) fails.

Shared Information State

The link represents a bipartite relationship, in which individual "Elements of Shared Information" (ESI) are maintained with an appropriate protocol to ensure their conserved property. State (bits) on either side of the link is maintained to keep track of (a) whether this side of the link has the ESI or not, and (b) what the value of the ESI is. If Alice's Half-Link holds Ø, then Alice may also keep track of the last or most recent value. This plays an important role in the function of the link. If we no longer have the ESI, but we remember the old value, then we can compare what the new value is when it comes back from the other side. i.e., we can determine if it is a surprise or not. This is how we build up the basic TICK/TOCK operation. With more bits (e.g., ≥4) we can build up the ENTT and higher levels of conserved quantity protocols. In principle, a register of any width can be used. Smaller widths will transfer fewer bits and be 4 From a communications perspective, this ENTL token is like taking a full-duplex link and making it half duplex. We use this property when we want to send AIT tokens, to guarantee their atomicity. Typically, there will be TWO ENTL packets circulating (one initiated by Alice, and one initiated by Bob).

Larger widths provide room for additional conserved quantity functionality, for example, to extend the protocol to enable credit-based flow-control schemes on a multi-hop network.

If the value of the returning ESI comes back from Bob is the same as the previous value known to Alice, then we may have an event 6 but we do not have a change in information. We call this a modulo-1 or TOCK-TOCK protocol. If the value of the returning ESI is not the same as the previous value known to Alice, then we have both an event, and change (a surprise). We call this a modulo-2 or TICK-TOCK protocol.

An important aspect of the design is how we distinguish normal information (e.g., bits stored in memory), from shared information. This is where the disciplines of physics and computer science can differ. The ESI represented by ENTL and ENTT, is shared. i.e., if one side has this state, then the other side does not. Somewhat awkwardly we might describe this as information and non-information. Information is the answer to a YES/NO question. Information in communications is measured in bits. It is a surprise.

The ESI represents a shared state. One way to implement this is for Alice to combine her (local) state with what she sees as Bobs (remote) state and combine them into a single state that fits in the register. Nominally, 2 bits on each side to emulate a qubit, provides 4 bits in total that can be sent back and forth. However, perhaps a more efficient implementation can be made by thinking of this as Alice exchange one of her 2 bits with Bob, and Bob does the same. In effect, there are really only 3 bits: the last independent value seen on both sides of the link, and the shared bit, which bounces back and forth using the hot-potato protocol. Even more efficiently, we could consider only 1 bit of information is shared, but each side has a full/empty bit (described later) which says that they currently have "the" bit.

The underlying mechanism is very simple, so it should be easy to map out the state space for a 1, 2, 4, or higher number of "total" bits in the system. The key is that the information is shared, it is not a separate "bits" of information on each side. This is achieved by a protocol which constantly, and atomically, exchanges a portion of the state on one side, with a portion of the state on the other side. AIT is like a compare and swap operation, but on the message instead of in shared memory.

Protocol Types

Single ENTL ESI—1 bit Always set to 1, provides only TOCK-TOCK (for a sender) and TICK-TICK for a receiver. This may not be useful without an Rx transform, or Tx Transform. No visible change in the register for Alice or Bob.

Single ENTL ESI—1 bit If we have only one bit, and it alternates between 0 and 1. TICK-TOCK. This implies a change (either Tx or Rx Transform is active, but not both, on each side). Alice receives TICK (Ø) into a register (or memory) and does a Tx Transform (TxT) to (1), which goes out on the wire as a TOCK. Bob receives the TOCK (1) and reads this into his register (or memory) and does a TXT to 0, which goes out on the wire as a TICK, and the cycle completes. Symmetry is broken because Alice always sends TICKs and Bob always Sends TOCKs.

Single ENTL ESI, Asymmetric Transform. This model is the same as above, except the initiator (e.g., Alice) can break the symmetry, by choosing which transform to use for her side (Tx or Rx) and trigger the other side (Bob) to use the opposite, i.e., if Alice uses TxT, then Bob should use RxT. If Alice chooses RxT, then Bob uses TxT. This makes no difference on the wire, but it will complement the ESI state in the registers on each side, thus allowing us to provide the TICK TOCK visibility in the memory on each side, and the corresponding visibility of randomness in a read of the link.

Single ENTL ESI, 2 bits. We can now explore the state space of a 2-bit vector in the register, and on the wire, for all the permutations of Alice and Bob. There are many ways to do this. The essence is that Alice can synchronize with (observe) Bob's local state through the ENTL protocol, and Bob in turn can synchronize with (observe) Alice's local state; but there can be no observation of this state by entities outside the Half-Link, without disturbing the state of entanglement (i.e., stalling the protocol). An example would be for this protocol to allow Alice and Bob to alternately exchange their state. With one bit, we have the situation where one side has +1 and the other side has −1, on the next transition, we have the opposite. But one bit cannot encode the two other states: That both Alice and Bob do not have the ESI: it is "on the wire"; either on its way to Bob, or on its way to Alice. This gives us 4 possible states, which can be encoded in 2 bits, and appears to correspond with what we care about: the encoding of 2 qubits, which are entangled.

Single ENTT ESI is now used to provide transport (indivisible transfer) of AIT Tokens. This is described in more detail in the next section. ENTT switches coherently from the 2-phase protocol to the 4-state protocol, transfers the AIT token, allowing for failures to accept the token in the destination, and return it to the sender. i.e., reversibility when "little failures" occur.

Dual ESI Each side (Alice, Bob) initiates and maintain their own ENTL and ENTT protocols. AIT tokens are distinguished either by symmetry breaking, or some higher level of unique identifier.

Multiple ESI Each side (Alice, Bob) can pipeline multiple AIT tokens. Each Token must be unique, so that recovery can occur independently on each token.

Multiple ESI on a Chain A chain of cells: Alice, Bob, Charlie, Dave, Edward, Fred, etc., may have their own AIT tokens present on any one link. i.e., each link may support multiple concurrent AIT tokens[10], and the modulus of the counter will be set equal to the number of links in the chain.

Protocol Transforms

Implementing the concept of information being a surprise, or equivalently, a notion of time/evolution as change that we can count, the protocol may use a transform (e.g., a matrix operator) on the ESI state, contained in the incoming ENTL packet, as it comes in (Rx/received), as it goes out (Tx/sent), or both. Both sides of the link must execute the same (or a complementary) protocol to maintain symmetry. There are four possibilities, indicated by a protocol type (PROT=X, Y, where X=TxR, and Y=TXT):

1. PROT=TxR, TxT Do not transform on Rx. Do not transform on Tx.
2. PROT=TxR, TxT Do not transform on Rx. Transform on Tx.
3. PROT-TxR, TXT Transform on Rx. Do not transform on Tx.
4. PROT=TxR, TXT Transform on Rx. Transform on Tx.

Figure 5:
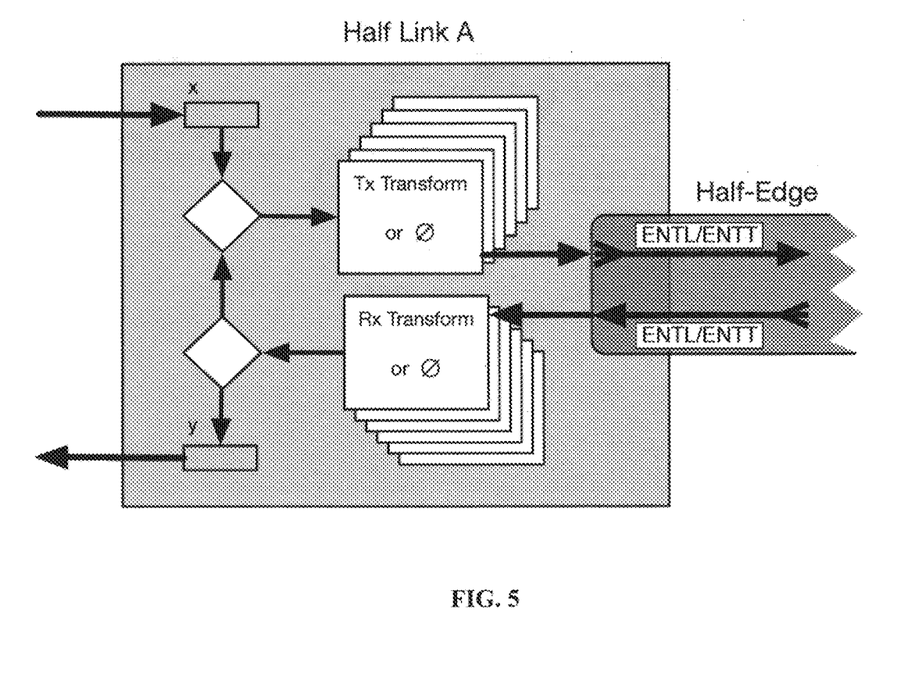
FIG. 5 shows transform equipment, according to an embodiment.
Figure 6:
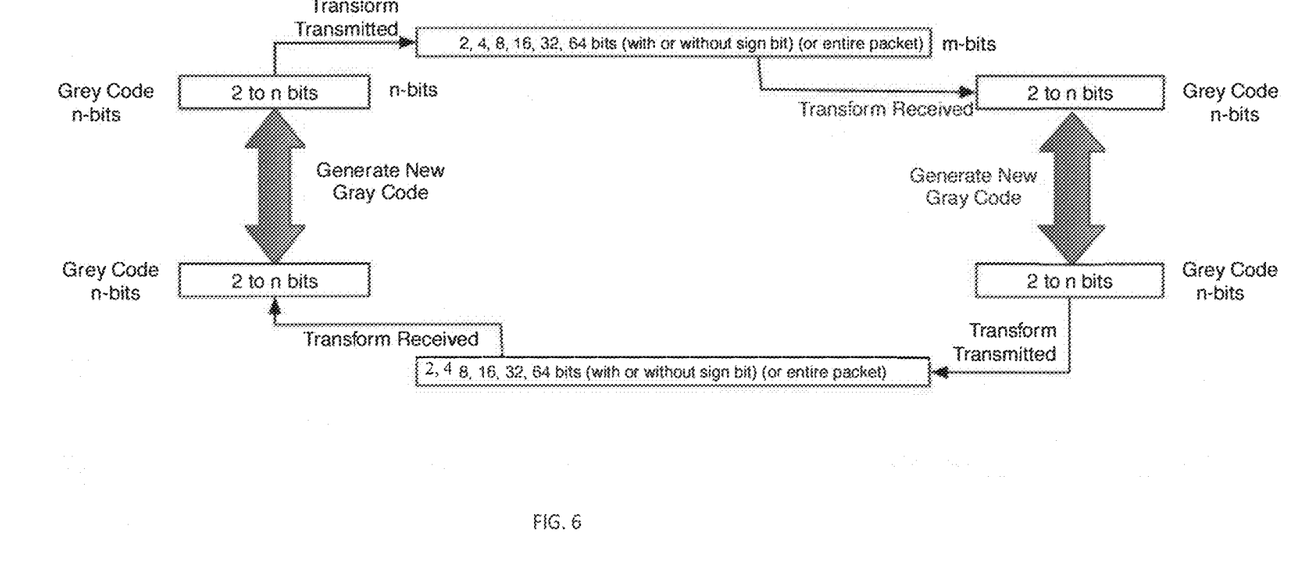
FIG. 6 shows a Rx-Tx transform, according to an embodiment.

The link is equipped with a mechanism to specify and enable these transforms. If the Rx transform is empty (an identity operator), then no transform is performed. Equivalently, for the Tx Transform. If the Rx transform is non-empty, then the transform will be carried out as specified in the equipment associated with the Half-Link. Equivalently for the Tx Transform, as shown in FIGS. 5 and 6. Transforms are typically implemented as a lookup table in the Half-Link.

FIG. 5 shows transform equipment, according to an embodiment.

FIG. 6 shows a Rx-Tx transform, according to an embodiment.

Transform Matrix (Rx, Tx) Observation

Information is change. If it doesn't change, it's not information. Observation on one side of the link involves the transfer of information from the Cell agent (register w) to the Half Link (register x), or the Half Link (register x) to the media (blue communication channel). The concept of "copying" is problematic, it will not serve our purpose of emulating entanglement. Instead, the ENTL and ENTT protocols are designed to work together to enforce the Conserved Quantities/Exchanged Quantities (CQ/EQ) property. Observation does not mean copying information, it means removing it. Once observed, the information is no longer part of the link, and the temporal intimacy is broken. When one side of the link takes this information, the temporal intimacy will be broken—for both sides of the link—(or at least "stalled") until this (or a new) piece of information is given back.

One way to treat the bits on each side of the link is to imagine that the qubit is the combination of an "presence bit" (pbit) and a "value bit" (vbit). If the pbit is full, then the vbit represents the current value. If the pbit bit is (Ø), then the vbit represents the last known current value. This is one potential way to implement entangled iVars. When we destroy the last known current value (for example, by randomizing it, stalling the calling process, or returning an error on a read unless the pbit bit was a ¬Ø), then we have a mechanism capable of emulating the no-cloning theorem.

These 2 bits at Alice can represent only four states. The 2 bits on Bob represent another four states (a total of 8 states). However, 4 bits can represent sixteen possible states. This implies that there are more interesting ways of encoding the possible 4 bits when viewed "together" as an entangled pair of qubits.

Treated separately, we can have two iVar's. The interesting question is what does it mean when both iVar's (pbits) are empty? i.e., Alice is Ø and Bob is Ø:

1. There is no ESI present in the link (the temporal intimacy is broken).
2. The ESI is "currently" on its way from Alice to Bob.
3. The ESI is "currently" on its way from Bob to Alice.

If both Alice is ¬Ø and Bob is ¬Ø then the protocol is broken, and we would not achieve the no-cloning theorem.

Our protocol is designed to prevent this from happening. Using the minimum set of bits described above, or by adding various forms of well-understood redundancy to the bits on the wire and in the memory to guard against corruption (a form of decoherence).

Another way to guard against the such situations is for Alice to transfer a more complete state to Bob (including her current knowledge of what she thinks Bob's state is), and for Bob to do the same. Our current implementation allows for up to a 32-bit integer to represent Alice's state, an another 32-bit integer to represent Bob's state. If this combined 64-bit value is sent back and forth (complete with Rx and/or Tx Transformations), then either Alice or Bob can perform a verification check such that the condition Alice=¬Ø and Bob=¬Ø can never occur without being detected.

Figure 7:
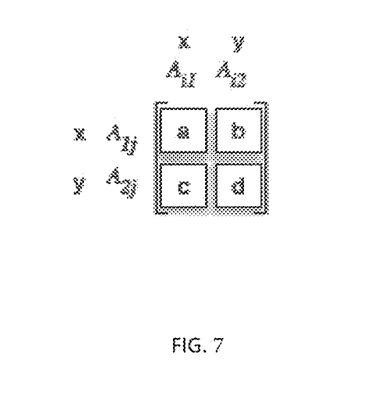
FIG. 7 shows a 2 by 2 transform matrix, according to an embodiment.
Figure 8:
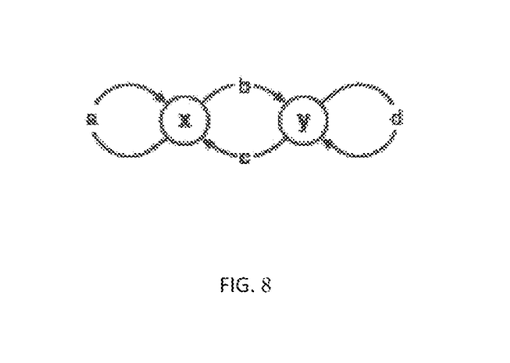
FIG. 8 shows bipartite information relationships, according to an embodiment.

Exactly-once semantics is achieved via this CQ/EQ mechanism, implemented with either the pbits described above, or integrated into a combined ESI. This goes beyond iVar's because our transform uses the equivalent of a Hadamard matrix for ENTL and the equivalent of a Pauli Matrix for the ENTT; which is far more elegant than a simple full/empty bit. The EQ/CQ aspects of the protocol provide the exactly once property, and the ¬Ø symbol in the buffer provides a transitive connection through the protocol to provide a push/pull mechanism for reversible control of the AIT tokens over the link FIG. 7 shows a 2 by 2 transform matrix, according to an embodiment.

Registers w, x, y and z.

The implementation "transfers" a "small number" of bits (e.g., a standard 8-, 16-, 32- or 64-bit integer) between the registers w, x, y and z (see FIGS. 1.2, 1.3 and 1.4). For example, the register x will hold a "value" of empty (Ø) as long as there are no AIT tokens to be sent. Note that this is different to the binary representation of Zero. This means we now have (at least) three states that need to be represented in each register: Binary 0, 1, and Ø. One engineering approach is to use two bits for each register. One bit represents presence (pbit): whether the information is there or not, the other bit represents the value if it was there.

There are several possible interpretations of "transfer" in this context. It could mean overwrite i.e., register w overwrites register x when it wishes to send an AIT token. It could mean that our "shared" information is currently (from an LOV perspective) in w, say 11 or 10. Or it is not currently in w; it is in x (or on its way down the communication channel); in which case the representation left behind in w is encoded as 01 or 00.

Another interpretation is that the contents of w and x are "swapped". E.g., the empty register x is swapped for the full register y. But we don't swap information in our implementation, we take it. So rather than the binary contents of one register being overwritten by the binary contents of another, the contents of one register is taken, and is added to another. This leaves the original register empty (Ø).

2 classical bits can represent a single qubit, but 4 classical bits can represent 2 entangled qubits. There are pros and cons and questions for each representation. One issue is symmetry breaking. ENTL can express a TICK/TICK, protocol, or a TICK/TOCK, protocol; depending on whether we are looking at each side with a Local Observer View (from within each end of the link), or a God's-Eye-View, for the link as a whole.

Push or Pull?

The conventional notion of measurement is to read (i.e., extract) information from a system. However, trying to read the TICK/TOCK state of the link will yield no actual information: a random 0 (TICK) or 1 (TOCK) will be equally probable to an outside (unsynchronized) observer. We might refer to this as a "pull" protocol.

The alternative is a "push". For an event to emerge at Alice, Bob has to add new information (in the form of an AIT token) on his side of the link. This will cause the link on Alice's side to receive an event that is recognized within the blue link area as an AIT token, and therefore pushed (transferred) to the Cell Agent's Buffer. By a push from register y to z, leaving y empty (Ø), and the link stalled until the ack is pushed from register w to register x, now leaving register w empty (Ø).

Event Atomicity and EQ/CQ Conservation

It is normal in computer communications to generalize the notion of a register to a buffer (a vector of registers). And to describe the process of information transfer as a conserved operation, swapping a full slot in a transmit buffer on one end of the link for an empty slot in the receive buffer on the other end of the link. In a very real way, our value of empty (Ø) represents the notion of this transmit buffer slot being empty. We extend this notion of conservation to provide quantum-like (no-cloning) behavior.

The link is equipped with a property we call Equal Quantities/Conserved Quantities (EQ/CQ). Because the transfer of an AIT token requires an ENTL packet to be replaced by an ENTT packet in order to trigger the transfer, and after the transfer, the ENTT packet to be replaced by an ENTL packet, we have an EQ/CQ system.

Unlike conventional protocols which may involve the loss, delay, duplication or reordering of packets and require an indeterminate number of retries, the ENTL/ENTT protocol facilitates recovery and maintenance of these conserved quantities. This in turn enables applications in the layers above to, for example, enjoy exactly once semantics, in their distributed algorithms. EQ/CQ also enables a classical implementation of the no-cloning theorem, which in-turn, supports the properties needed for Network Assisted Transactions (NAT).

ENTL Protocol

ENTL is the "liveness" protocol that provides a mechanism to emulate entanglement. It does this by trapping the simplest possible Element of Shared Information ESI, between two Cells (nodes on a computer) over a single link. This property is achieved by:

Alice prepares an Element of Independent Information (EII), capable of representing 3 or more states: +1, −1, and Ø.

Alice sends ENTL [hello] continually on the link until she receives an acceptance or counter-proposal.

Alice sends the first ENTL [hello] packet to Bob, which (necessarily) contains only what she knows herself: e.g., a 2-bit vector for her Element of Independent Information (EII).

Bob responds to Alice's proposal by sending back an Element of Shared Information (ESI), which is Alice's EII merged with his own EII (another 2-bit vector). This pair of combined EII's now forms a 2×2 matrix of Alice's and Bob's 2-bit vectors which we call an ESI. The goal (in the implementation as well as mathematically) is to use the simplest mechanism, and a number of required bits on the wire, to maintain this shared state.

Alice and Bob now exchange (send back and forth) this ESI, perpetually updating each other on their best knowledge of this shared state.

Alice combines her full awareness of the ESI (both halves), and sends that back and forth with Bob.

2-Party Atomic Swap

The combined TICK TOCK is a two-party swap. The Tick transfers Alice's information to Bob, and the TOCK transfers Bob's information, and the last known Alice information back to Alice.

Difference Between CAS and AIT Atomicity

Shared Memory Atomicity (SMA) is all about a "swap" between a register in a processor core, and a memory location. Message Passing Atomicity (MPA) is all about swapping information between two ends of a link. The goal is a protocol that, using the minimum possible number of roundtrips, and bits required in the packet, provides the maximum physically realizable "common knowledge" between the two ends.

ENTT Protocol

ENTL is the "liveness" protocol, ENTT is the "Transaction" Protocol, which transfers the AIT Token from one side of the link to the other. But the two must maintain coherence.

The ENTL protocol is a basic resource to maintain what is called "liveness" in the computer science literature, but which we call "temporal intimacy" here because of its ability to atomically transition to a 4-phase protocol and maintain coherence while AIT tokens are transferred with local reversibility property.

Coherence: The terminology we have used in the past has been ENTL tokens (which are timeless), and ENTT Tokens (AIT). However, there is a fundamental CQ relationship between the ESI representing the timeless ENTL 2-phase protocol, and the transactional ENTT 4-phase protocol. i.e., the ENTL ESI is an event which depends on a local trigger, will continue that event into an ENTT ESI, to transfer the AIT token (along with any logical bits associated with it), and then the final ESI event of the ENTT protocol is carried back into an ENTL ESI to complete the transfer, and terminate (flush) the last transaction.

AIT Reversibility

We begin with an AIT token owned by the sender. The ENTT protocol sends the AIT token in the first phase of the protocol, without a prepare ("are you ready") phase-which is implicit in the ENTL TICK-TOCK liveness protocol. The response from the receiver on receipt of the first ENTT packet is to store the AIT token, and any logical variables associated (piggybacked) with it. The protocol proceeds through the 4 states in the shared state machine (SSM), with each transition representing an event sent over the wire in a packet. If any one of the packets is lost, the SSM will stall, with both sides of the link off by at most one. A hazard analysis of the loss of each transition is matched to a specific mitigation in the recovery protocol (which may simply be re-establishing temporal intimacy on the same link, or routing around via other cells to retrieve the state that was stalled in the other Half-Link).

Figure 9:
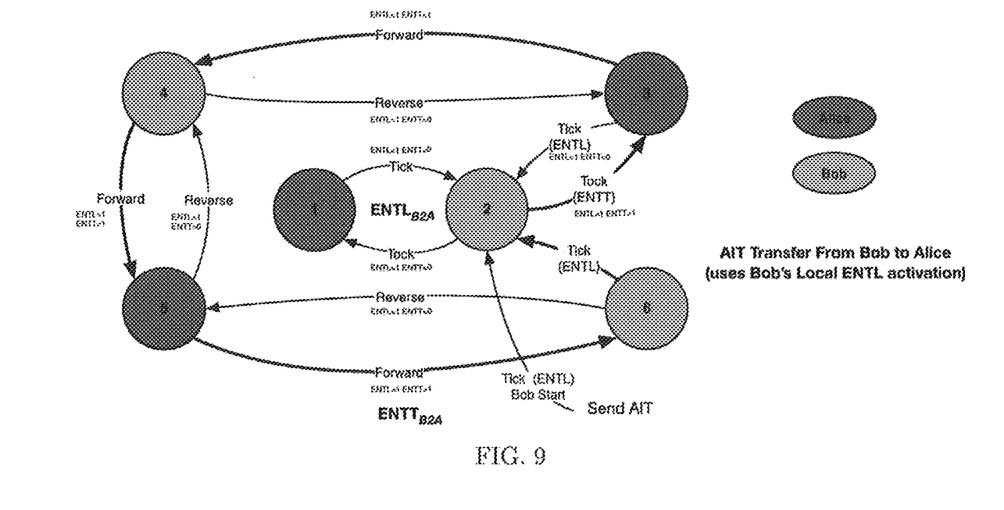
FIG. 9 shows a shared state machine for Alice, according to an embodiment.

FIG. 9 shows a shared state machine for Alice, according to an embodiment.

Figure 10:
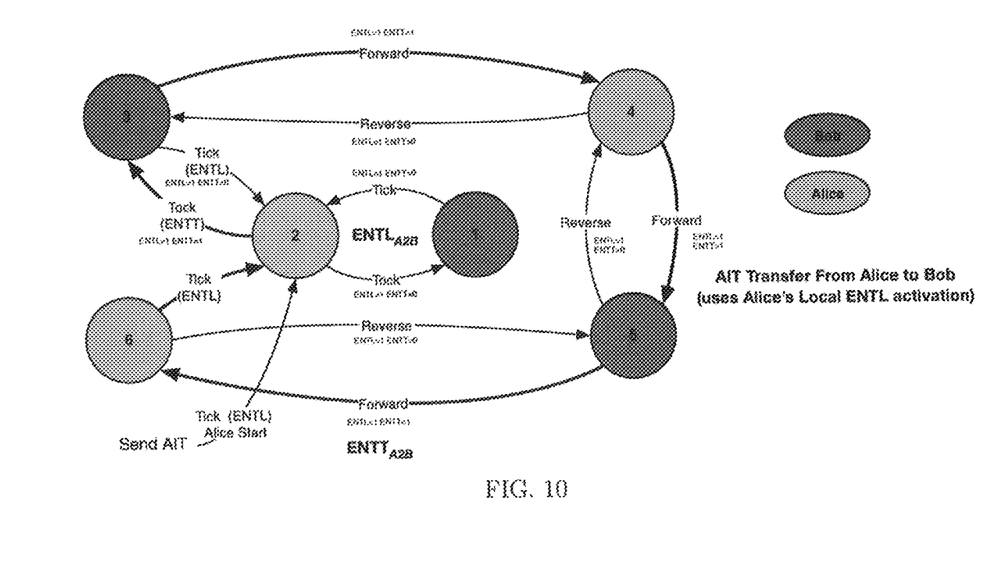
FIG. 10 shows a shared state machine for Bob, according to an embodiment.

FIG. 10 shows a shared state machine for Bob, according to an embodiment.

Once the AIT token has gone through, the owner no longer has any control of it (a higher-level protocol may in a different design), particularly after the ENTT protocol is finally flushed by a cycle of ENTL. However, if the receiver has a problem, such as failure of its local application, it can "push" the AIT token back to the sender as unprocessed. This resets the link, for that AIT token, back to the state it was in before the transfer. i.e., it reverses time on that link. Whatever can happen in the AIT protocol can unhappen.

Pipelined AIT Tokens

Figure 11:
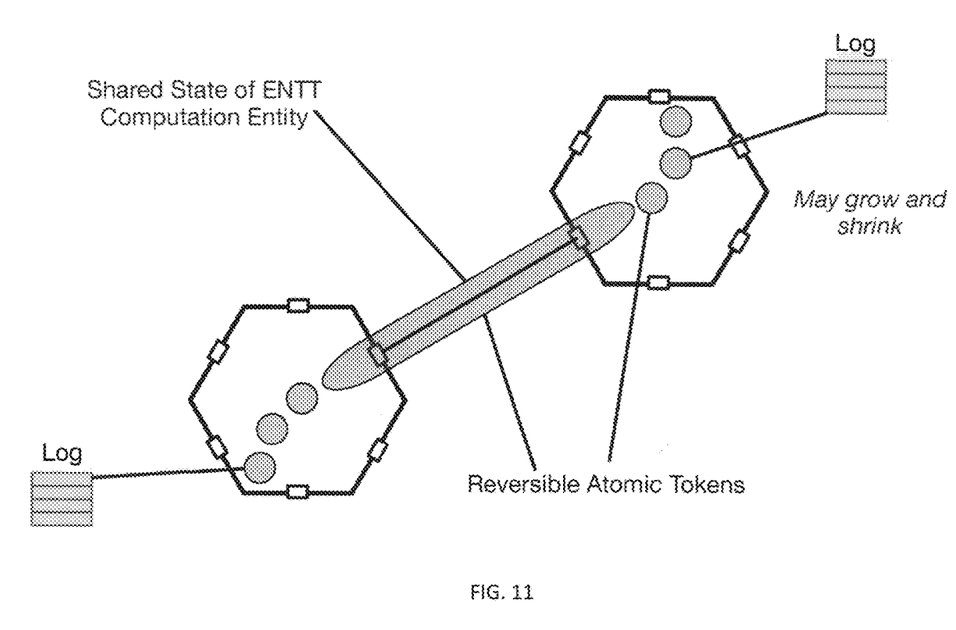
FIG. 11 shows an embodiment of a computing environment configured according to the present disclosure, according to an embodiment.

Multiple AIT tokens may be pipelined, i.e., while only one may be concurrently active on each link, multiple tokens can be sent over a link before the first one is processed at the receiving end as shown in FIG. 11. Multiple AIT tokens may also be in transit over a chain of links (identified by a top-level tree id).

In order to pipeline, each AIT token must have its own identity. This enables an unlimited number of AIT tokens to be transferred (limited only by the local capacity of the Half-Links), and it enables recovery should the link fail and the healing algorithms route around the failure and need to "reconnect" the Half-Link's on the new path.

Each ENTT Transfer of an AIT token must be interspersed with at least one cycle of ENTL on the link to flush the reversibility phase for the initial Transfer. This means that the sending side can no longer retrieve the AIT token. However, the receiving side can still send the AIT token back, if it discovers a reason to do so before it is processed by the application layer.

FIG. 10 shows a link computation entity, according to an embodiment.

Multicast AIT Tokens

While a single AIT token can be transferred from a source to a target (un-named endpoint) cell over a chain of links in much the same way as it is done between adjacent cells, we need to add additional mechanism to manage the delivery of "an AIT token" to multiple intermediate points along the chain. The principal difficulty is that the atomicity property we seek from the EQ/CQ mechanisms need to account for delivery to multiple (possibly unknown number of) endpoints. There are multiple ways to achieve this:

Send separate AIT Tokens which are (successively) retired by each cell along the path. When there are no more destinations, the AIT transfer will fail and the group transaction will be complete.

Send a single AIT token with a "count", allowing each cell to decrement the count. If the count does not go down to zero, then either an error occurred, or one or more members departed from the group. Either way, this provides a highly efficient way to do reliable multicast, and an integrated group membership protocol on our stacked tree implementation.

Send a single AIT token on each port (branch) of the sender (root for that tree). When the outgoing token reaches another cell, it branches (replicates) into the number of children of that cell. It does this until each of the AIT token replicas reaches a leaf. At the leaf, a return AIT token is reflected back, and accumulates information on each cell (including the leaf). Each intermediate cell waits until all its children have responded, and then sends a "summary" token rootward. When the root finally has all response AIT tokens, it now has a complete picture of the cells which responded.

Combining ENTL and Flow Control

The conserved quantities (CQ/EQ) mechanisms are able to subsume additional functionality, such as a credit-based flow control, on a single link, on a chain, or on a tree. The basic ENTL protocol is described above for a single link, but it can easily be extended to a chain or a tree.

ENTL packets can carry additional information, such as the amount of buffer space available in the subvirtualization layer (SVL)—the layer which contains the mechanisms we trust and manage to achieve the EQ/CQ properties of the SVL. In this context, we say that the ENTL packet is "equipped" with a mechanism (state machine and fields within the packets) to provide an infrastructure capability, such as credit-based flow control, or some other function intrinsic to the mechanisms already in the SVL.

Combining ENTL and Load Balancing

ENTL packets can carry even higher-level information, such as the amount of processing capability available in the Hyper containers (applications). In this context, we say that the ENTL packet is decorated with a mechanism (state machine and fields within the packets) to provide an application capability, such as load balancing.

An important use case for the ENTL technology is recursive load balancing, which exploits the state decoration on computation link. The ENTL protocol enables each cell in a tree to know if it is still connected to its parent, and whether each of its children are connected or not. Starting at an ingest cell (root on the tree). The first node handles the request, if it has capacity, it processes the packet, if not it passes it round robin to one of its children. This proceeds recursively through the tree, automatically. Fault detection is implicit in the ENTL protocol, and atomic transfer of packet can be "assisted" by the AIT mechanism (ENTT protocol). Alternatives other than round robin may be exploited by decorating the link with artifacts such as: load, available capacity, error state, and, ultimately, the processing "capacity" of the entire branch of descendants further down the tree.

Another use case is Strong Serializability for Replicated Storage Systems. For example, an update (for a file, or a KV store) comes into the root of the tree. It propagates the writes down a tree, and the readers are assigned to be the leaves. If a failure is detected (For example, by the ENTL or ENTT protocol), they are redirected to the closest parent cell on the path to that leaf. This guarantees they will never see an out of order read.

A Perspective on Conventional Quantum Protocols

It's easy to say that emulated entanglement is not real entanglement. A precise scientific description requires the mathematics of Hamiltonians and Hilbert Spaces, and its experimental demonstration requires single photon emitters and receivers, using cryogenically cooled systems to minimize the effects of decoherence.

But the universe we live in is quantum. Everything that we do, see, hear and touch is governed by a quantum mechanical reality, and entanglement is arguably the very essence of nature at its most fundamental level.

So, in a way, if our classical implementation is done correctly, it can yield many of the benefits of what we have come to expect from entanglement. This is why we refer to this protocol as a "classical implementation" of entanglement. It has many of the properties of Quantum Entanglement, even though it may appear to be implemented with conventional (classical) design ideas.

FIG. 11 shows how a stream of ENTT (AIT) Tokens passes through the system. The state represented by each of these tokens is self-contained in the protected data structures on either side of the link, however, while it is in the link, it represents a shared state which is "smeared across" the link between the two cells. This arrangement of hardware, software and data structures is reversible, i.e., tokens may pass both forward and backwards between the cells, and until they are picked up (retired) by the agents responsible on each side, they can remain in the "reversible log" and be indefinitely available for reversal. An example use case would be the reversible vector clock described elsewhere in this disclosure.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the one embodiment using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of various techniques has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

What is claimed is:

1. A computer-implemented method for sending an Atomic Information Transfer (AIT) token from a cell to multiple cells within a mesh of cells through multiple intermediate endpoints to complete the AIT token transfer among each cell within the mesh of cells, comprising:
    (a) sending multiple separate AIT tokens successively to the mesh of cells unless the multiple separate AIT tokens are retired by each cell along the path of the AIT token within the mesh of cells, wherein the AIT tokens are transferred from one cell to another cell within the mesh of cells and wherein the AIT token transfer fails once the AIT token transfers to each cell within the mesh of cells indicating the AIT token transfer is complete; or
    (b) sending a single AIT token with a count allowing each cell within the mesh of cells to decrement the count wherein if the count does not go to zero, then either an error occurred while sending the single AIT token or during the transfer of the single AIT token from one cell to another cell within the mesh of cells or one or more cells departed from the mesh of cells; or
    (c) sending a single AIT token on each port within the mesh of cells, wherein as the single AIT token transfers from one cell to another cell, the single AIT token replicates itself into other cells within each port, collects and accumulates information from each cell and returns the AIT token from each cell within each port and send a summary token comprising a summary of information from each cell within each port forward, wherein the summary token reflects each cell information which respond to the AIT token and each cell information which did not respond to the AIT token.

2. The computer-implemented method of claim 1, wherein each AIT token has a unique identifier, wherein recovery of each AIT token can occur independently of another.

3. The computer-implemented method of claim 1, wherein the method enables load balancing.

4. The computer-implemented method of claim 1, wherein the method enables credit-based control flow on a single link.

5. The computer-implemented method of claim 1, wherein each cell within the mesh of cells sending the AIT token to another cell within the mesh of cells cannot make a change to the AIT token after sending the AIT token.

6. The computer-implemented method of claim 1, wherein each cell within the mesh of cells receiving the AIT token from another cell within the mesh of cells rejects the AIT token back to the cell and sends the AIT token as unprocessed if the cell within the mesh of cells receiving the AIT token has a failure of local application.

7. The computer-implemented method of claim 6, wherein rejecting and sending the AIT token as unprocessed, return the AIT token back to the state the AIT token was before the beginning of the AIT token transfer.

8. The computer-implemented method of claim 1, wherein the cell within the mesh of cells sending the AIT token cannot retrieve the AIT token after sending the AIT token.

9. The computer-implemented method of claim 1, wherein the multiple AIT tokens can be pipelined such that only one AIT token may be concurrently active.

10. The computer-implemented method of claim 1, wherein the AIT token is transferred from one cell within the mesh of cells to another cell within the mesh of cells over a communication link.

11. The computer-implemented method of claim 1, wherein sending the AIT token from a cell within the mesh of cells initiates a 4-phase protocol through a shared state machine (SSM).

12. The computer-implemented method of claim 1, wherein the AIT token comprises a packet of information.

13. The computer-implemented method of claim 1, wherein the method performs exactly one semantics.

* * * * *